US008119039B2

(12) United States Patent
Kadowaki et al.

(10) Patent No.: US 8,119,039 B2
(45) Date of Patent: Feb. 21, 2012

(54) TRANSPARENT CONDUCTIVE SUBSTRATE

(75) Inventors: Yasushi Kadowaki, Oita (JP); Kazufumi Kai, Oita (JP)

(73) Assignee: Showa Denko K.K., Tokyo (JP)

( * ) Notice: Subject to any disclaimer, the term of this patent is extended or adjusted under 35 U.S.C. 154(b) by 342 days.

(21) Appl. No.: 12/296,245

(22) PCT Filed: Apr. 5, 2007

(86) PCT No.: PCT/JP2007/058019
§ 371 (c)(1),
(2), (4) Date: Oct. 6, 2008

(87) PCT Pub. No.: WO2007/117030
PCT Pub. Date: Oct. 18, 2007

(65) Prior Publication Data
US 2009/0166589 A1 Jul. 2, 2009

(30) Foreign Application Priority Data

Apr. 6, 2006 (JP) ................................. 2006-105017

(51) Int. Cl.
*H01B 1/06* (2006.01)
(52) U.S. Cl. ......... 252/519.33; 252/299.01; 252/301.16; 252/301.35; 252/510; 428/447; 428/451; 442/232; 526/261; 526/318.43; 528/300
(58) Field of Classification Search ............ 252/301.35, 252/500, 511, 299.01, 301.16, 510, 519.33; 349/158; 351/159; 425/458; 428/1.4, 447, 428/451; 528/300; 526/216, 318.43, 261; 442/232
See application file for complete search history.

(56) References Cited

U.S. PATENT DOCUMENTS 4,959,451 A 9/1990 Uchida et al.
5,116,670 A * 5/1992 Suzuki et al. ................ 442/232
5,218,067 A * 6/1993 Uchida et al. ................ 526/261
5,380,809 A * 1/1995 Uchida et al. ............ 526/318.43
5,645,901 A * 7/1997 Fukuchi et al. ................ 428/1.4

(Continued)

FOREIGN PATENT DOCUMENTS

EP       0 420 208 A2    4/1991
JP       57-173816 A    10/1982
JP       02-221365 A     9/1990

(Continued)

*Primary Examiner* — Khanh Tuan Nguyen
(74) *Attorney, Agent, or Firm* — Sughrue Mion, PLLC

(57) ABSTRACT

A transparent conductive substrate using allyl ester heat-curable resin, including a compound having a group represented by formula (2) as terminus and a group represented by formula (3) as repeating unit,

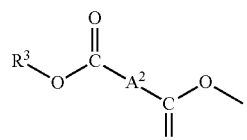

(2)

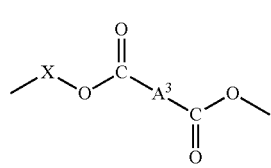

(3)

where $R^3$, $A^2$, and $A^3$ in the formulae have the same meanings as defined in the specification.

44 Claims, 1 Drawing Sheet

U.S. PATENT DOCUMENTS

| | | |
|---|---|---|
| 5,731,071 A | 3/1998 | Etchu et al. |
| 6,629,833 B1 * | 10/2003 | Ohya et al. .................... 425/458 |
| 6,700,637 B2 * | 3/2004 | Yano et al. .................... 349/158 |
| 6,739,720 B2 * | 5/2004 | Ooga et al. .................... 351/159 |
| 2004/0236064 A1 * | 11/2004 | Ooga et al. .................... 528/300 |
| 2005/0191567 A1 | 9/2005 | Kunimoto et al. |

FOREIGN PATENT DOCUMENTS

| | | |
|---|---|---|
| JP | 02-251509 * | 10/1990 |
| JP | 06-074239 B2 | 9/1994 |
| JP | 08-152952 A | 6/1996 |
| JP | 2001-135150 A | 5/2001 |

* cited by examiner

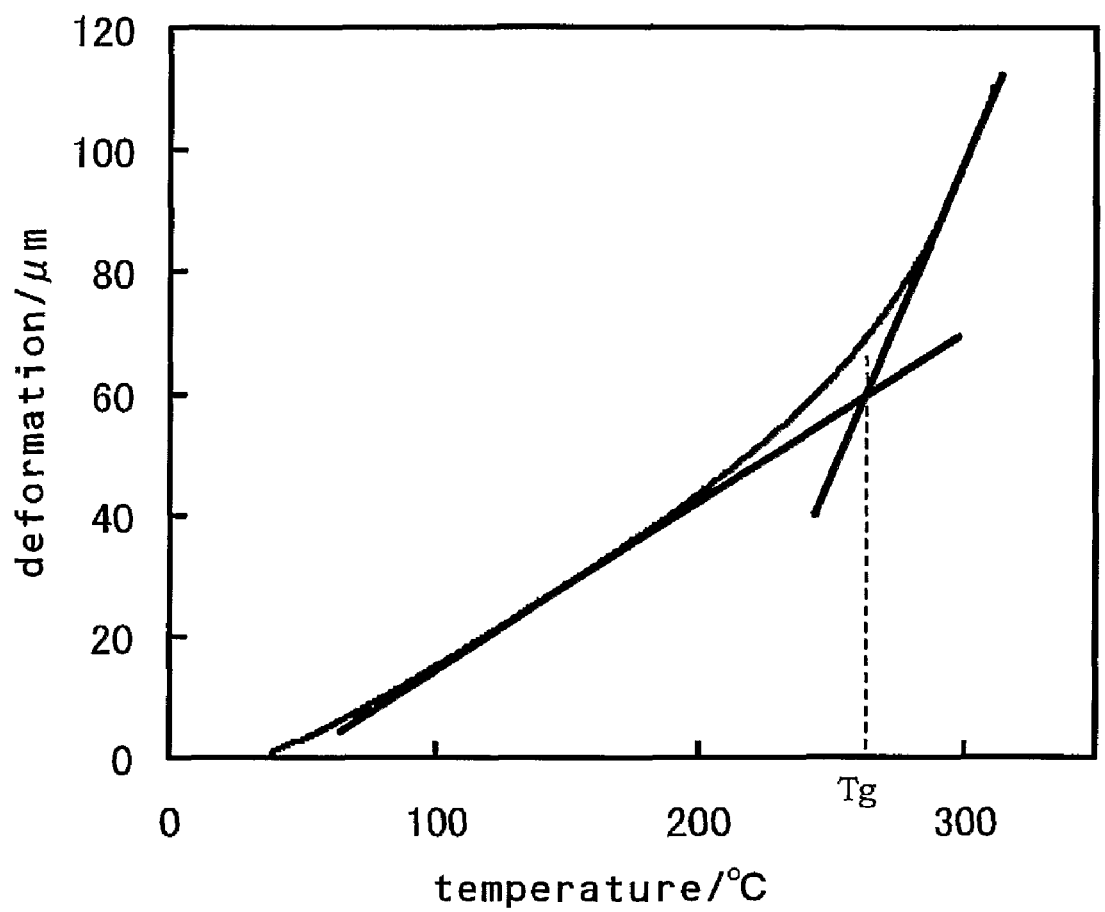

TRANSPARENT CONDUCTIVE SUBSTRATE

TECHNICAL FIELD

The present invention relates to a transparent conductive substrate using allyl ester resin as substrate. More specifically, the present invention relates to a transparent conductive substrate having excellent heat resistance and excellent transparency, which can be used as transparent electrode plates for touch panel and liquid crystal panel and as transparent conductive electrode plates for organic EL display device.

BACKGROUND ART

Recently, in the field of display devices, there are demands for advanced technologies such as smaller thickness, lighter weight, larger area, various arbitrary shapes and curved display.

Especially, as for display devices used in portable apparatuses, there are strong demands for lighter weight and long durability. As use of portable apparatuses expands, display panels using plastic substrate in place of glass substrate have been studied and put into practical use in some cases.

However, as the display shifts to color movies, there are growing demands for higher-speed response of display device and for TFT (Thin Film Transistor) display devices, organic EL (ectroluminescence) devices and the like. Glass substrates are still being employed as substrates for these display devices and it is hoped to shift to plastic substrates reduced in weight and excellent in durability.

However, heat resistance of conventional plastic substrates is insufficient, which may cause warpage or deformation in the step of forming metal semiconductors or insulating films through CVD (Chemical Vapor Deposition).

Further, since the difference in the thermal expansion rate between resin layer constituting the substrate and the electrode is large, cracking tends to generate especially in the transparent substrate of TFT liquid crystal substrate which is exposed to drastic temperature change at the time of processing, which may result in increase in electric resistance value or sometimes in disconnection, and therefore practical application of such substrates has not begun yet.

Although some types of heat-curable resins such as epoxy resin have an improved heat resistance, transparency of such types of resin is insufficient. In contrast, those having good transparency have a low glass transition temperature (Tg) and are inferior in heat resistance.

Liquid crystal display devices can be categorized into transmissive type liquid crystal, reflective type liquid crystal and semitransmissive type liquid crystal as a mixed type of reflective type and transmissive type.

A transmissive type liquid crystal display device is a type of device displaying images by using backlight at the back surface of the display screen as light source, having high chroma saturation, which can realize eye-friendly screen even in a dark room. But it has a disadvantage that a measurable amount of power is required.

On the other hand, a reflective type liquid crystal display device is a type of display device, using reflection of outside light to display images, has been attracting attention for its battery-friendliness, and attempts to make the substrate plastic have been made. For example, Japanese Patent Application Laid-Open No. 11-2812 shows that a laminate plate comprising fiber cloth impregnated with resin or the like, such as glass epoxy laminate, is used as substrate for a reflective liquid crystal display device. However, reflective conductive substrate shown there, which uses white pigment in the reflective layer, cannot meet the recent demand for high precision and high contrast display.

DISCLOSURE OF INVENTION

The present invention provides a transparent conductive resin substrate used for display device, excellent in heat resistance and chemical resistance, low in mean coefficient of linear thermal expansion, having high transparency, which does not easily involve warpage, deformation or cracks in wires in the process of forming a thin-film device.

The present inventors have made intensive studies and as a result, have found out that a specific thermosetting resin is remarkably high not only in heat resistance but also chemical resistance as compared with conventional thermosetting resins used for transparent conductive substrates, that the thermosetting resin can give high adhesion and low coefficient of linear thermal expansion, with high transparency and therefore that the resin can achieve excellent properties when used for transparent conductive substrate, thereby completing the present invention.

That is, the present invention relates to the transparent conductive substrates of following 1 to 6 and uses 7 to 12 of the substrates.

1. A transparent conductive substrate, which is obtained by forming a transparent electrode on an allyl ester resin substrate having a glass transition temperature of 160° C. or higher, which substrate is prepared by curing an allyl ester resin composition.
2. The transparent conductive substrate described in 1, wherein the allyl ester resin composition contains an allyl ester oligomer having an ester structure formed of polyvalent alcohol and dicarboxylic acid, having allyl group and/or methallyl group as terminuses.
3. The transparent conductive substrate described in 2, wherein the allyl ester resin composition further contains at least one compound represented by formula (1).

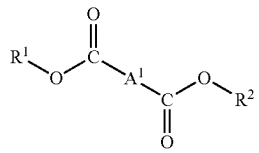

(1)

($R^1$ and $R^2$ each independently represent an allyl group or a methallyl group, $A^1$ represents one or more kinds of organic residues having an alicyclic structure or aromatic ring structure derived from dicarboxylic acid.)

4. The transparent conductive substrate described in 2, wherein at least one of the allyl ester oligomers has a group represented by formula (2) as terminus, and also has a structure represented by formula (3) as constituent unit.

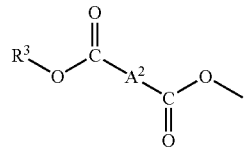

(2)

(In the formula, $R^3$ represents an allyl group or a methallyl group, $A^2$ represents one or more kinds of organic residue having an alicyclic structure and/or an aromatic ring structure derived from dicarboxylic acid.)

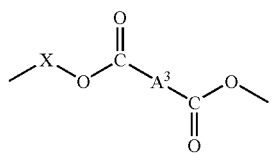

(3)

(In the formula, $A^3$ represents one or more kinds of organic residue having an alicyclic structure and/or an aromatic ring structure derived from dicarboxylic acid, X represents one or more kinds of organic residue derived from polyvalent alcohol, with a proviso that X may have a branched structure through ester bonds, having a group represented by formula (2) as terminus and a group represented by formula (3) as constituent unit.)

5. The transparent conductive substrate described in 4, wherein the dicarboxylic acid in formula (2) or (3) is at least one kind selected from the group consisting of terephthalic acid, isophthalic acid, phthalic acid and 1,4-cyclohexane dicarboxylic acid.

6. The transparent conductive substrate described in any one of 1 to 5, wherein the allyl ester resin composition further contains reactive monomers.

7. A transparent electrode plate for touch panel, using the transparent conductive substrate described in any one of 1 to 6 as electrode.

8. A touch panel having the electrode plate described in 7.

9. A transparent electrode plate for liquid crystal display device, using the transparent conductive substrate described in any one of 1 to 6 as electrode.

10. A liquid crystal display device, using the electrode plate described in 9.

11. A transparent electrode plate for organic EL display device, using the transparent conductive substrate described in any one of 1 to 6 as electrode.

12. An organic EL display device, using the electrode plate described in 11.

According to the present invention, by using a cured product of allyl ester resin as substrate, a transparent conductive substrate usable in various types of display devices, low in electric resistance, excellent in heat resistance and chemical resistance, low in mean coefficient of linear thermal expansion, having high transparency, which does not easily involve cracking, deformation or cracks in wires in the process of forming a thin-film device, can be provided.

BRIEF DESCRIPTION OF DRAWINGS

The graph of FIG. 1 shows a TMA curve of the cured product of oligomer (1) prepared in Example 1.

BEST MODE FOR CARRYING OUT THE INVENTION

The present invention will be described in detail hereinbelow.

<Allyl Ester Resin>

The allyl ester resin used for the transparent conductive substrate in the present invention is a kind of thermosetting resin.

Generally, the term "allyl ester resin" means both prepolymer before cured (including oligomer, additives or monomer) and cured product of such a polymer. In the present specification, the term "allyl ester resin" means a cured product and the term "allyl ester resin composition" means a prepolymer before cured.

<Allyl Ester Resin Composition>

The allyl ester resin composition for transparent conductive substrate of the present invention is a composition containing a compound having allyl group or methallyl group (hereinafter, both sometimes referred to as "(meth)allyl group") and an ester structure as its main curing component.

The compound having (meth)allyl group and an ester structure can be obtained through (1) esterification reaction between a compound having a (meth)allyl group and a hydroxy group (here, collectively referred to as "allyl alcohol") and a compound having a carboxyl group, (2) esterification reaction between a compound having a (meth)allyl group and carboxyl group and a compound having a hydroxyl group, or (3) through ester exchange reaction between an ester compound consisting of allyl alcohol and dicarboxylic acid and a polyvalent alcohol. In a case where the compound having a carboxyl compound is a polyester oligomer of dicarboxylic acid and a diol, the compound may have allyl alcohol ester only at terminus.

It is preferred that the compound having a (meth)allyl group and an ester structure serving as the main cured component in the allyl ester resin composition of the present invention be an allyl ester compound having an ester structure formed of polyvalent alcohol and dicarboxylic acid, having an allyl group and/or a methallyl group as terminus (hereinafter, the compound is sometimes referred to as "allyl ester oligomer").

Further, the compound may contain as other components curing agent described later, reactive monomer, additives and other radically reactive resin components.

Other than allyl ester oligomers, examples of compound having a methallyl group an ester structure include diallyl ester compounds corresponding to the oligomer. Examples thereof include allyl ester resin compositions having at least one kind of compound represented by formula (1).

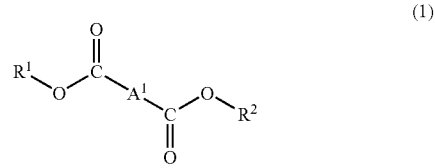

(1)

($R^1$ and $R^2$ each independently represents an allyl group or a methallyl group, $A^1$ represents one or more kinds of organic residue having an alicyclic structure and/or aromatic ring structure derived from dicarboxylic acid.) In formula (1), preferably $R^1$ and $R^2$ are allyl groups. With respect to $A^1$, the definition and specific examples are the same with those of $A^2$ described later.

Further, as other components, curing agents, reactive monomers, additives and other radically reactive resin components may be contained.

<Allyl Ester Oligomer>

It is preferred that the allyl ester oligomer of the present invention be a compound having a group represented by formula (2) as terminus, and having a structure represented by formula (3) as constituent unit.

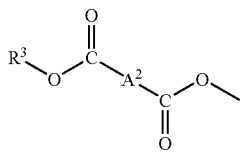

(2)

(In the formula, $R^3$ represents an allyl group or a methallyl group, $A^2$ represents one or more organic residues having an alicyclic structure and/or an aromatic ring structure derived from dicarboxylic acid.)

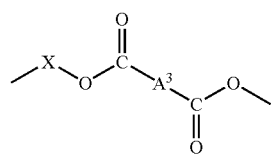

(3)

(In the formula, $A^3$ represents one or more organic residues having an alicyclic structure and/or an aromatic ring structure derived from dicarboxylic acid, X represents one or more organic residues derived from polyvalent alcohol, with a proviso that X may have a branched structure through ester bonds, having formula (2) as terminus and formula (3) as constituent unit.)

In the allyl ester oligomer of the present invention, there are at least two terminuses represented by formula (2), but in a case where x in formula (3) has a branched structure, there are three or more. In this case, as there are multiple terminuses, there are multiple $R^3$'s. These $R^3$'s do not have to be of the same kind with each other, and the structure may include an allyl group as one terminus and a methallyl group as another terminus.

Moreover, all the $R^3$'s do not necessarily have to be an allyl group or a methallyl group. In an extent that does not impair curability, some of the $R^3$'s may be a non-polymerizable group such as methyl group and ethyl group.

Similarly, with respect to the structure of the organic residue represented by $A^2$, the terminuses may be different from each other. For example, the structure may include be a benzene ring as one terminus $A^2$ when there is a cyclohexane ring as another terminus.

$A^2$ in formula (2) is one or more kinds of organic residue having an alicyclic structure and/or an aromatic ring structure derived from dicarboxylic acid. The portion derived from dicarboxylic acid is shown as carbonyl structure adjacent to $A^2$. Therefore, $A^2$ shows a benzene skeleton or a cyclohexane skeleton.

There is no particular limitation on dicarboxylic acid from which $A^2$ is derived from. From the viewpoint of ready availability of raw materials, terephthalic acid, isophthalic acid, phthalic acid, 1,4-cyclohexane dicarboxylic acid, 1,4-naphthalene dicarboxylic acid, 1,5-naphthalene dicarboxylic acid, 2,7-naphthalene dicarboxylic acid, diphenyl-m,m'-dicarboxylic acid, diphenyl-p,p'-dicarboxylic acid, benzophenone-4,4'-dicarboxylic acid, p-phenylene diacetate, p-carboxyphenyl acetate, methyl terephthalic acid and tetrachlorophthalic acid are preferred and terephthalic acid, isophthalic acid, phthalic acid and 1,4-cyclohexane dicarboxylic acid are more preferred. In view of enhancing heat resistance temperature evaluated based on glass transition temperature (Tg) and thermal deformation temperature and thereby enabling film formation of transparent electrodes such as indium tin oxide (ITO) at a higher temperature, terephthalic acid and 1,4-cyclohexane dicarboxylic acid are most preferred.

Also, within an extent that does not impair the effects of the present invention, non-cyclic (at the time of reaction) dicarboxylic acid of maleic acid, fumaric acid, itaconic acid, citraconic acid, endic anhydride, chlorendic anhydride or the like may be used.

At least one constituent unit represented by formula (3) is required in allyl ester oligomer. It is preferred that the molecular weight of the whole allyl ester oligomer be increased to a certain level by repetition of this unit, so that appropriate viscosity may be obtained, enhancing workability and strength of cured product.

A preferred range of the weight-average molecular weight of the allyl ester oligomer is from 500 to 200000, more preferably from 1000 to 100000.

$A^3$ in formula (3) is one or more kinds of organic residue having an alicyclic structure and/or an aromatic ring structure derived from dicarboxylic acid, and its definition and preferred examples of the compound are the same as in $A^2$ in formula (2).

X in formula (3) represents one or more kinds of organic residue derived from polyvalent alcohol.

A polyvalent alcohol is a compound having two or more hydroxyl groups and X itself represents the skeleton portion except for hydroxyl groups.

Further, in the polyvalent alcohol, since at least two hydroxyl groups have to be bonded, some hydroxyl groups may remain unreacted when the polyvalent alcohol has a valence of three or more. i.e. it has three or more hydroxyl groups.

Examples of polyvalent alcohol include ethylene glycol, propylene glycol, 1,3-propane diol, 1,4-butane diol, 1,3-butane diol, 1,5-pentane diol, neopentyl glycol, 1,6-hexane diol, 1,4-cyclohexane dimethanol, diethylene glycol, 3-mol ethylene oxide adduct of isocyanuric acid, pentaerythritol, tricyclodecanedimethanol, glycerine, trimethylol propane, 3-mol ethylene oxide adduct of pentaerithritol, D-sorbitol and hydrogenated bisphenol-A. There is no particular limitation on production method for these compounds. For example, the method described in Examined Japanese Patent Application Laid-Open No. H06-74239 (U.S. Pat. No. 4,959,451) may be used.

With respect to the constituent unit represented by formula (3) in the allyl ester oligomer, one type of the constituent unit may be repeated or different types of the unit may be included. That is, the allyl ester oligomer may be a copolymer type. In this case, in one allyl ester oligomer, several kinds of X exist. For example, the structure may include a residue derived from propylene glycol as one X and another residue derived from trimethylol propane as another X. In this case, allyl ester oligomer has branches at trimethylol propane residue. Two or more types of $A^3$ may exist as well. A structural formula (4), in a case where $R^3$ is an allyl group, $A^2$ and $A^3$ are residues derived from isophthalic acid, X is propylene glycol or trimethylol propane, is shown below.

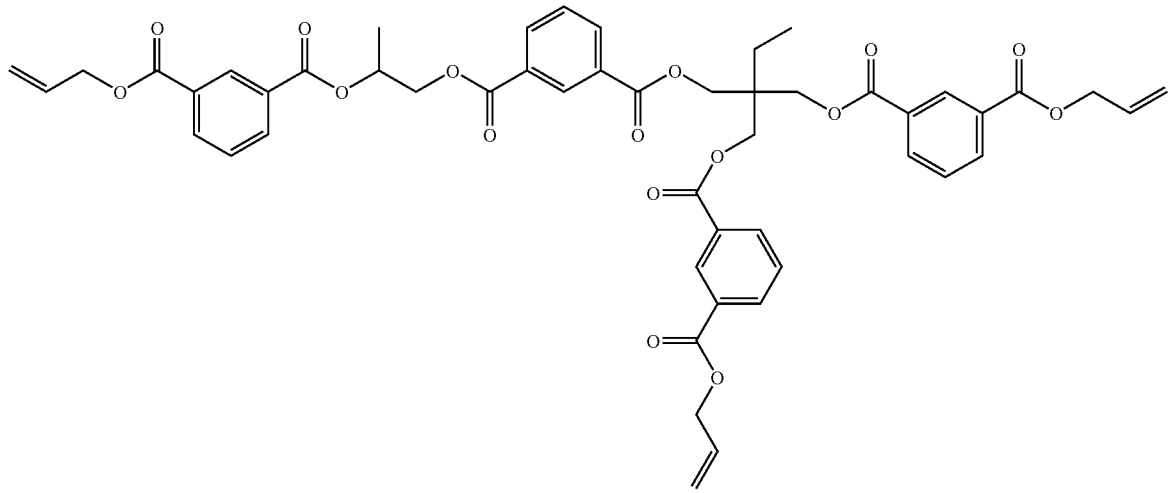

(4)

<Curing Agent>

In order to cure the allyl ester resin composition of the present invention, curing may be conducted by generating radicals through heating. However, it is preferred that curing agent be used. There is no particular limitation on curing agents usable in the present invention. Generally, those used as curing agent for polymerizable resin can be used. Among those, it is preferred that from the view point of initiating polymerization of allyl group, a radical polymerization initiator be added. Examples of radical polymerization initiator include organic peroxides, photo-polymerization initiator and azo compounds. Among these, particularly preferred is organic peroxide in terms of uniformly curing the allyl ester resin composition of the present invention.

Examples of organic peroxides usable here include known ones such as dialkyl peroxide, acyl peroxide, hydroperoxide, ketone peroxide and peroxy ester, and specific examples thereof include benzoyl peroxide, 1,1-bis(t-butylperoxy)cyclohexane, 1,1-di(t-hexylperoxy)-3,3,5-trimethyl cyclohexane, 2,2-bis(4,4-dibutylperoxy cyclohexyl)propane, t-butylperoxy 2-ethyl hexanate, 2,5-dimethyl 2,5-di(t-butyl peroxy) hexane, 2,5-dimethyl 2,5-di(benzoyl peroxy)hexane, t-butyl peroxy benzoate, t-butylcumyl peroxide, p-methyl hydroperoxide, t-butyl hydroperoxide, cumene hydroperoxide, dicumyl peroxide, di-t-butyl peroxide and 2,5-dimethyl 2,5-dibutylperoxy hexyne-3.

Examples of above-described photo-polymerization initiator include 2,2-dimethoxy-1,2-diphenylethane-1-on, 1-hydroxyhexyl phenyl ketone, benzophenone, 2-methyl 1-(4-methyl thiophenyl)-2-morpholino propane 1,2-benzyl-2-dimethylamino-1-(4-morpholinophenyl)-butanone-1,2-hydroxy-2-methyl 1-phenylpropane-1-on and 2,4,6-trimethylbenzoyl diphenyl phosphine oxide.

One of these radical polymerization initiator may be used singly or two or more of them may be used in combination.

There is no particular limitation on the blending amount of these curing agents. It is preferred that the blending amount of curing agent be from 0.1 to 10 mass parts based on 100 mass parts of the allyl ester resin composition (in a case where reactive monomers described later or radically reactive resin composition are contained, based on the total mass including these components and the allyl ester resin component), more preferably from 0.5 to 5 mass parts. If the blending amount of the curing agent is less than 0.1 mass parts, it is difficult to achieve satisfactory curing rate. If the blending amount exceeds 10 mass parts, the finally obtained cured product sometimes becomes fragile and its mechanical strength deteriorates.

<Reactive Monomer>

To the allyl ester resin composition of the present invention, reactive monomer (reactive diluent) may be added for the purpose of controlling the curing reaction rate, adjusting viscosity (improvement of workability), enhancing crosslinking density and imparting functions.

There is no particular limitation on reactive monomers and various types may be used. In view of allowing the reactive monomer with the allyl ester oligomer, preferred is a monomer having a radically polymerizable carbon-carbon double bond such as vinyl group and allyl group. Examples thereof include unsaturated aliphatic acid ester, aromatic vinyl compound, vinyl ester of saturated aliphatic acid or aromatic carboxylic acid or derivatives thereof and crosslinkable polyfunctional monomer. Among these, with crosslinkable polyfunctional monomer, crosslinking density of cured products can be controlled. Preferred examples of the reactive monomer are described below.

Examples of unsaturated aliphatic acid ester include alkyl (meth)acrylates such as methyl(meth)acrylate, ethyl(meth)acrylate, butyl(meth)acrylate, 2-ethylhexyl (meth)acrylate, octyl(meth)acrylate, dodecyl(meth)acrylate, octadecyl (meth)acrylate, cyclohexyl(meth)acrylate and methyl cyclohexyl(meth)acrylate;

acrylates of aromatic esters such as phenyl(meth)acrylate, benzyl(meth)acrylate, 1-naphtyl (meth)acrylate, fluorophenyl(meth)acrylate, chlorophenyl (meth)acrylate, cyanophenyl(meth)acrylate, methoxyphenyl (meth)acrylate and biphenyl(meth)acrylate;

haloalkyl(meth)acrylate such as fluoromethyl (meth)acrylate and chloromethyl(meth)acrylate; and glycidyl(meth)acrylate, alkyl amino(meth)acrylate and α-cyanoacrylate eater.

Examples of aromatic vinyl compound include styrene, α-methylstyrene, chlorostyrene, styrene sulfonic acid, 4-hydroxystyrene and vinyl toluene.

Examples of vinyl ester of saturated aliphatic acid or aromatic carboxylic acid and derivatives thereof include vinyl acetate, vinyl propionate and vinyl benzoate.

Examples of crosslinkable polyfunctional monomer include di(meth)acrylates such as ethylene glycol di(meth)acrylate, diethylene glycol di(meth)acrylate, triethylene glycol di(meth)acrylate, tetraethylene glycol di(meth)acrylate, tripropylene glycol di(meth)acrylate, 1,3-butylene glycol di(meth)acrylate, 1,4-butanediol di(meth)acrylate, 1,5-pentadiol di(meth)acrylate, 1,6-hexadiol di(meth)acrylate, neopentyl glycol di(meth)acrylate, oligoester di(meth)acrylate, polybutadiene di(meth)acrylate, 2,2-bis(4-(meth)acryloyloxyphenyl)propane and 2,2-bis(4-ω-(meth)acruloyloxypyriethoxy)phenyl)propane;

diallyls of aromatic dicarboxylic acid such as diallyl phthalate, diallyl isophthalate, dimethallyl isophthalate, diallyl terephthalate, triallyl trimellate, 2,6-naphthalene dicarboxylic acid diallyl, 1,5-naphthalene dicarboxylic acid diallyl, 1,4-xylene dicarboxylic acid allyl and 4,4'-diphenyl dicarboxylic acid diallyl;

bifunctional crosslinkable monomers such as cyclohexane dicarboxylic acid diallyl and divinyl benzene;

trifunctional crosslinkable monomers such as trimethylol ethane tri(meth)acrylate, trimethylol propane tri(meth)acrylate, pentaerythrotol tri(meth)acrylate, tri(meth)allyl isocyanurate, tri(meth)allyl cyanurate, triallyl trimellitate and diallyl chlorenedate; and tetrafunctional crosslinkable monomers such as pentaerythritol tetra(meth)acrylate.

One of the above reactive monomers may be used singly or two or more kinds of them may be used in combination. There is no particular limitation on the use amount of these reactive monomers. It is preferable that the amount be from 1 to 1000 mass parts based on 100 mass parts of the allyl ester oligomer, more preferably from 2 to 500 mass parts, most preferably from 5 to 100 mass parts. If the use amount of the reactive monomer is less than 1 mass parts, the effect of reducing viscosity is small, resulting in deterioration in workability and further, in a case where polyfunctional monomer is used as reactive monomer, crosslinking density becomes low and heat resistance sometimes becomes insufficient, which is not preferred. If the use amount exceeds 1000 mass parts, transparency of the allyl ester resin itself cannot be expressed or mechanical strength derived from the allyl ester resin deteriorates in some cases, which is not preferred.

<Radically-Reactive Resin Component>

The allyl ester resin composition of the present invention may contain radically-reactive resin components for the purpose of improving its properties. A radically-reactive resin means a polymer having in the main or side chain a radically-polymerizable functional group such as an ethylenic carbon-carbon double bond. Examples of the resin component include unsaturated polyester resin and vinylester resin.

Unsaturated polyester resin is the condensation product obtained through esterification reaction between polyvalent alcohol and unsaturated polybasic acid (and if necessary, saturated polybasic acid), if necessary by dissolving the condensation product in polymerizable unsaturated compound such as styrene. Specifically, Polyester resin Handbook, published by NIKKAN KOGYO SHIMBUN, LTD. in 1988, describes about examples of such a resin in pages 16-18 and 29-37. Such an unsaturated polyester resin can be produced by known methods.

Vinyl ester resin, also referred to as "epoxy (meth)acrylate", is a resin having a polymerizable unsaturated group generally produced through ring-opening reaction between an epoxy compound having an epoxy group such as epoxy resin and carboxyl group of a compound having a polymerizable unsaturated group such as (meth)acrylic acid or a resin having a polymerizable unsaturated group generally produced through ring-opening reaction between a compound having a carboxyl group and epoxy group of a polymerizable unsaturated compound having epoxy groups in molecules group such as glycidyl(meth)acrylate. Specifically, Polyester resin Handbook, published by NIKKAN KOGYO SHIMBUN, LTD. in 1988, describes about examples of such a resin in pages 336-357. Such a vinyl ester resin can be produced by known methods.

Examples of epoxy resin serving as raw material for vinylester resin include bisphenol A diglycidyl ether and its high-molecular weight homolog, glycidyl ether of bisphenol A alkylene oxide adduct, bisphenol F diglycidyl ether and its high-molecular weight homolog, glycidyl ether of bisphenol F alkylene oxide adduct and novolak-type polyglycidyl ether.

One of the above radically reactive resin components may be used singly or two or more kinds of them may be used in combination.

There is no limitation on the use amount of the radically reactive resin component. It is preferable that the amount be from 1 to 1000 mass parts based on 100 mass parts of the allyl ester oligomer, more preferably from 2 to 500 mass parts, most preferably from 5 mass parts to 100 mass parts.

If the use amount of the reactive monomer is less than 1 mass parts, the effect of enhancing mechanical strength derived from the radically reactive resin component is small, resulting in deterioration in workability and moldability, which is not preferred. If the use amount exceeds 1000 mass parts, heat resistance of the allyl ester resin itself cannot be expressed in some cases, which is not preferred.

<Additives>

To the allyl ester resin composition for transparent conductive substrate according to the present invention, additives such as UV absorber, antioxidant, defoaming agent, leveling agent, mold release agent, lubricant, water repellant, flame retardant, anticontractile agent, and crosslinking aid may be added if necessary, for the purpose of improving hardness, strength, moldability, durability and water resistance.

There is no particular limitation on the antioxidant and those widely used may be employed. Preferred examples among them include phenol-based or amine-based antioxidant serving as radical chain inhibitor, and particularly preferred is phenol-based antioxidant. Specific examples of phenol-based antioxidant include 2,6-t-butyl-p-cresol, 2,6-t-butyl-4-ethylphenol, 2,2'-methylene bis(4-methyl6-t-butylphenol) and 1,1,3-tris(2-methyl 4-hydroxy-5-t-butylphenyl)butane.

There is no particular limitation on the lubricant and those widely used may be employed. Preferred examples among them include metallic soap-based lubricant, aliphatic acid ester-based lubricant and aliphatic hydrocarbon-based lubricant and particularly preferred is metallic soap-based lubricant. Specific examples of metallic soap-based lubricant include barium stearate, calcium stearate, zinc stearate, magnesium stearate and aluminium stearate. These may be used in composite.

There is no particular limitation on the UV absorber and those widely used may be employed. Preferred examples among them include benzophenone-based UV absorber, benzotriazol-based UV absorber and cyanoacrylate-based UV absorber and particularly preferred is benzophenone-based UV absorber. Specific examples of benzophenone-based UV absorber include 2-(2'-hydroxy-5'-methylphenyl)benzotriazol, 2-(2'-hydroxy-5'-butylphenyl)benzotriazol and 2-(2-hydroxy-3'-tert-butylphenyl)benzotriazol.

The additives are not limited by those examples described above and various types of additives may be employed within a range that does not disturb the object and effects of the present invention.

<Solvent>

In addition, in curing the allyl ester resin composition for transparent conductive substrate according to the present invention, solvent may be used if reduction in viscosity is necessary according to the curing method. However, considering that a step of removing solvent is required at a later stage in a case solvent is used, it is preferred that viscosity be adjusted by using the above mentioned reactive monomer.

Examples of solvent usable for adjusting viscosity include aromatic hydrocarbons such as toluene and xylene, esters of acetic acid such as methyl acetate, ethyl acetate, propyl acetate and butyl acetate, ketones such as acetone, methyl ethyl ketone and methyl isobutyl ketone, ethers such as tetrahydrofuran and 1,4-dioxane and alcohols such as ethyl alcohol, (iso)propyl alcohol and butyl alcohol.

<Viscosity of Allyl Ester Resin Composition>

There is no particular limitation on viscosity of the allyl ester resin composition for transparent conductive substrate according to the present invention. It is preferred that the viscosity be suitable for the molding method employed.

For example, in case of cast molding, it is preferable that the viscosity at 25° C. be in a range of 0.01 (Pa·s) to 1,000 (Pa·s). If the viscosity at 25° C. is lower than 0.01 (Pa·s) or higher than 1,000 (Pa·s), workability is deteriorated, which is not preferred.

For example, in case of transfer molding, it is preferable that the viscosity at 80° C. be in a range of 0.01 (Pa·s) to 1,000 (Pa·s). If the viscosity at 80° C. is lower than 0.01 (Pa·s) or higher than 1,000 (Pa·s), more molding defects may occur, which is not preferred.

The viscosity of the curable resin can be measured by JIS K6901.

<Cured Product of Allyl Ester Resin>

The allyl ester resin composition can be obtained by mixing the allyl ester oligomer, the reactive monomer, the curing agent and various additives by known methods. The composition can be cured with heat, ultraviolet ray or electron beam through coating using a roll-coater or a spin coater by curing methods such as cast molding method and photo fabrication.

The curing temperature in molding the allyl ester resin composition of the present invention is in a range about 30 to about 150° C., preferably 40 to 130° C.

In consideration for shrinkage and distortion generated during the curing step, it is preferable that the composition be gradually cured while gradually increasing the temperature, generally it is preferable that curing time be 0.5 to 100 hours, preferably 3 to 50 hours, more preferably 10 to 20 hours.

The glass transition temperature (Tg) of cured product of the allyl ester resin of the present invention is 160° C. or higher. The Tg values according to the present invention are measured by the method described in Examples. The higher the Tg, the more preferable, within a range that does not deteriorate transparency, in that the temperature of the resin substrate can be high in the process of forming a transparent conductive film of indium tin oxide or the like on the substrate through sputtering. Tg of 180° C. or higher is more preferable, and most preferably 200° C. or higher. Tg can be adjusted by changing the main chain structure of the allyl ester oligomer or crosslinking density of cured product. By increasing the blending amount of polyfunctional radical polymerizable monomer or making the main chain structure rigid by employing an aromatic ring or the like, Tg is enhanced. Alternatively, Tg can be also adjusted by changing the type and amount of polymerization initiator, curing conditions or the like.

<Transparent Conductive Substrate>

The transparent conductive substrate of the present invention comprises a transparent conductive film formed on a substrate consisting of the cured product of the allyl ester resin.

For the transparent conductive film, known metallic films, metal oxide film and the like may be used. Among them, in terms of transparency, conductivity and mechanical strength, metal oxide film is preferred. Examples of metal oxide film include indium oxide, cadmium oxide and tin oxide having tin, tellurium, cadmium, molybdenum, tungsten, fluorine, zinc, germanium or the like added thereto as impurities, and zinc oxide and titanium oxide having aluminium added thereto as impurities. Among these, indium tin oxide thin film containing 2 to 15 mass % of tin oxide, having excellent transparency and conductivity, is preferably used.

The film thickness of the transparent conductive thin film is set according to the target surface resistance. Generally, it is preferable that the thickness be within a range of 4 to 800 nm, particularly preferably 5 to 500 nm. If the film thickness of the transparent conductive thin film is less than 4 nm, it tends to be difficult to form a continuous thin film, failing to show good conductivity. If the thickness exceeds 800 nm, transparency tends to be decreased.

Examples of method for forming a transparent conductive film include sputtering method, ion plating method and vacuum deposition method. Moreover, it is preferable that the temperature for heating the substrate in the film forming step be thermal distortion temperature of the substrate or lower.

In ITO film formation, the higher the temperature for heating the substrate, the more preferable. The higher the temperature in forming an ITO film, the more crystallization proceeds and the smaller the electric resistance becomes. Accordingly, it is preferable that film formation be conducted at a highest temperature lower than heat resistance temperature evaluated based on glass transition temperature (Tg) and thermal deformation temperature. According to the present invention, the allyl ester resin substrate, having high heat resistance, enables film formation at a temperature of 150° C. or higher.

Examples of sputtering method include normal sputtering method using a target oxide and reactive sputtering method using a target metal. In this step, oxygen, nitrogen or the like may be introduced as reactive gas, or measures such as ozone addition, plasma irradiation and ion assist may be employed. Also, within a range that does not impair the object of the present invention, bias such as direct current, alternate current and high frequency wave may be applied to the substrate.

The transparent conductive substrate of the present invention can be used for transparent electrode substrates of touch panels, liquid crystal display devices and organic EL display devices.

EXAMPLES

Hereinafter, the present invention will be explained in more detail below with reference to Synthesis Examples, Examples and Comparative Examples, but the present invention is not limited thereto.

In addition, property values described in the Examples and the Comparative Examples of the present invention were measured by the following methods.

Glass Transition Temperature (Tg)

The measurement of glass transition temperature (Tg) was performed by thermomechanical analysis (TMA) using a thermoanalyzer (TMA-50) manufactured by Shimadzu Corporation. The size of a test piece used for the measurement was 3×8×8 (mm), and linear expansion coefficient from 30 to 300° c. was measured at temperature increase rate of 5° c./minute under 50 mL/min of nitrogen atmosphere to obtain the discontinuity point as the glass transition temperature. That is, as shown in FIG. 1, with the horizontal axis representing the temperature and the vertical axis representing deformation of the sample (the length of the sample), intersection of the extrapolation lines in the regions above and below Tg point was considered as Tg.

Total Light Transmission

The total light transmission was measured with a test sample having a thickness of 3 mm in accordance with JIS K7361-1 using NDH-2000 manufactured by Japan Electronics Industry Co., Ltd.

Surface Resistance Value

The surface resistance value was measured by pressing an HR probe of Hiresta IP MPC-HT260 manufactured by Mitsubishi Chemical Corporation, on an electrically conductive film formed on a surface of a cured product.

Synthesis Example 1

In a 2 L-volume three-neck flask equipped with a distillation unit, 1625 g of diallyl terephthalate, 167 g of propylene glycol and 0.813 g of dibutyl tin oxide were placed. The mixture was heated under nitrogen stream while distilling off generated alcohol at 180° C. At the time point when the amount of the distilled alcohol reached about 170 g, the inside of the reaction system was depressurized gradually to 6.6 kPa over about 4 hours to accelerate the distillation rate of alcohol. At the time point when almost no distilled liquid coming out was observed, the inside of the reaction system was depressurized to 0.5 kPa and reaction was continued for another 1 hour. Then the reaction product was cooled down. Hereinafter, the thus obtained reaction product is called "oligomer (1)". Although some diallyl terephthalate remains unreacted in oligomer (1), the obtained product including this is referred to as "oligomer (1)" for the sake of simplicity. This simplicity is applied to the other Synthesis Examples.

Synthesis Example 2

In a 2 L-volume three-neck flask equipped with a distillation unit, 1400 g of diallyl 1,4-cyclohexanedicarboxylate, 165.4 g of trimethylolpropane and 1.40 g of dibutyltinoxide were placed. The mixture was heated under nitrogen stream while distilling off generated alcohol at 180° C. At the time point when the amount of the distilled alcohol became about 150 g, the inside of the reaction system was depressurized gradually to 6.6 kPa over about 4 hours to accelerate the distillation rate of alcohol. At the time point when almost no distilled liquid coming out was observed, the inside of the reaction system was depressurized to 0.5 kPa and reaction was continued for another 1 hour. Then the reaction product was cooled down. Hereinafter, the thus obtained reaction product is called "oligomer (2)".

Synthesis Example 3

In a 2 L-volume three-neck flask equipped with a distillation unit, 1400 g of diallyl 1,4-cyclohexanedicarboxylate, 125.91 g of pentaerythritol and 1.40 g of dibutyl tin oxide were placed. The mixture was heated under nitrogen stream while distilling off generated alcohol at 180° C. At the time point when the amount of the distilled alcohol became about 150 g, the inside of the reaction system was depressurized gradually to 6.6 kPa over about 4 hours to accelerate the distillation rate of alcohol. At the time point when almost no distilled liquid coming out was observed, the inside of the reaction system was depressurized to 0.5 kPa and reaction was continued for another 1 hour. Then the reaction product was cooled down. Then, 700 g of the obtained reaction product was transferred into a disposable plastic cup and 300 g of triallyl isocyanurate was added thereto, followed by stirring with a stirrer until the mixture became uniform. Hereinafter, the thus obtained reaction product is called "oligomer (3)".

Synthesis Example 4

In a 2 L-volume three-neck flask equipped with a distillation unit, 1625 g of diallyl isophthalate, 167 g of propylene glycol and 0.813 g of dibutyl tin oxide were placed. The mixture was heated under nitrogen stream while distilling off generated alcohol at 180° C. At the time point when the amount of the distilled alcohol became about 170 g, the inside of the reaction system was depressurized gradually to 6.6 kPa over about 4 hours to accelerate the distillation rate of alcohol. At the time point when almost no distilled liquid coming out was observed, the inside of the reaction system was depressurized to 0.5 kPa and reaction was continued for another 1 hour. Then the reaction product was cooled down. Hereinafter, the thus obtained reaction product is called "oligomer (4)".

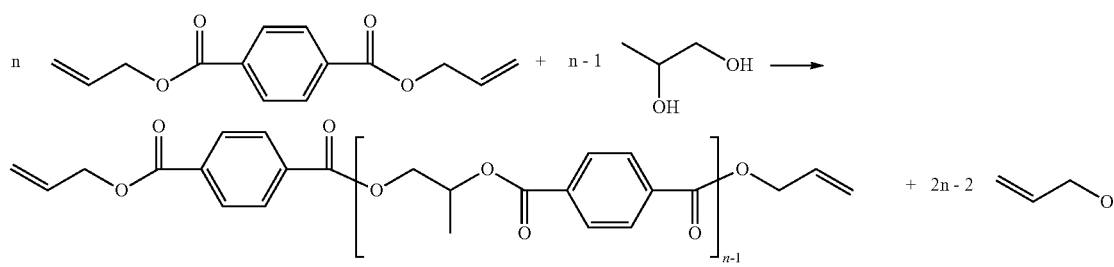

(5)

Example 1

To 100 mass parts of oligomer (1) produced in Synthesis Example 1, 3 mass parts of 1,1-di(t-hexylperoxy)-3,3,5-trimethyl cyclohexane) (product name: Perhexa TMH; manufactured by NOF CORPORATION) was added and stirred completely. The mixture was poured into a mold sandwiching a 3-mm silicon rubber spacer between 2 glass plates. Curing was conducted under the condition of increasing the temperature that the mold was kept in the atmosphere in an oven at 80° C. for 2 hours, then the temperature was increased in 8 hours from 80 to 100° C. and the temperature was kept at 100° C. for 2 hours, then the temperature was increased in 4 hours from 100 to 120° C., and the temperature was kept at 120° C. for 2 hours, to thereby prepare a resin plate. According to measurement, the cured product had a Tg of 273° C.

The resin plate was set in a vacuum coater capable of sputtering to thereby laminate thereon a transparent conductive thin film consisting of oxides of indium and tin through sputtering. And oxide, a target consisting of 95 mass % of indium oxide and 5 mass % of tin oxide with the filling degree of 95% was used. The substrate was heated by a micro heater and a halogen heater inside the apparatus to thereby maintain the temperature of the substrate at 150° C. After evacuating inside of the vacuum coater to 1.3 mPa, a mixed gas of argon and oxygen (volume ratio of argon:oxygen=98.5 to 1.5) was introduced continuously by a mass flow meter. Sputtering was performed at a pressure of 0.27 Pa with DC input power of 0.8 w/cm$^2$ to the target.

The obtained ITO thin film had a thickness of 150 nm and a surface resistance value of 30Ω/□. The total light transmittance of this laminated product was 91%.

Example 2

A resin plate was prepared in the same manner as in Example 1 except that oligomer (2) produced in Synthesis Example 2 was used instead of oligomer (1). According to measurement, the cured product had a Tg of 313° c.

Further, a transparent conductive thin film having a thickness of 150 nm was laminated on the resin plate in the same manner as in Example 1. The obtained ITO thin film had a surface resistance value of 30Ω/□ and the total light transmittance of the laminated product was 90%.

Example 3

A resin plate was prepared in the same manner as in Example 1 excepting that oligomer (3) produced in Synthesis Example 3 was used instead of oligomer (1). As a result of a measurement, the cured product had a Tg of 320° c.

Further, a transparent conductive thin film having a thickness of 150 nm was laminated on the resin plate in the same manner as in Example 1. The obtained ITO thin film had a surface resistance value of 30Ω/□ and the total light transmittance of the layered product was 91%.

Comparative Example 1

A transparent conductive thin film having a thickness of 150 nm was laminated on a commercially available acrylic plate (polymethacrylate plate: product of Sumitomo Chemical Co., Ltd., Tg: 80° c.) in the same manner as in Example 1 except that the temperature of the substrate was 70° C. The obtained ITO thin film had a surface resistance value of 52Ω/□ and the total light transmittance of the layered product was 74%.

Comparative Example 2

A transparent conductive thin film having a thickness of 150 nm was laminated on a commercially available polycarbonate plate (product of Takiron Co., Ltd., Tg: 150° c.) in the same manner as in Example 1 excepting that the temperature of the substrate was 100° C. The obtained ITO thin film had a surface resistance value of 48Ω/□ and a total light transmittance of the layered product was 75%.

Comparative Example 3

A resin plate was prepared in the same manner as in Example 1 excepting that oligomer (4) obtained in Synthesis Example 4 was used instead of oligomer (1). The Tg value as measured on the cured product was 87° C.

A transparent conductive thin film having a thickness of 150 nm was laminated in the same manner as in Example 1 excepting that the temperature of the substrate was 75° C. The obtained ITO thin film had a surface resistance value of 50Ω/□ and a total light transmittance of this laminated product was 90%.

Comparative Example 4

An attempt to laminate a transparent conductive thin film having a thickness of 150 nm on the resin plate was made using the substrate obtained in Comparative Example 3 in the same manner as in Comparative Example 3 excepting that the temperature of the substrate was 150° C. But warpage of the substrate occurred.

Result of measurements on physical properties of the substrates of the present invention (Examples) and conventional substrates (Comparative Examples) are shown in the table below.

TABLE 1

| | substrate | Tg (° c.) | total light transmittance (%) | Substrate temperature at the time of film formation (° c.) | surface resistance value (Ω/□) |
|---|---|---|---|---|---|
| Example 1 | substrate with cured oligomer (1) thereon | 273 | 91 | 150 | 30 |
| Example 2 | substrate with cured oligomer (2) thereon | 313 | 90 | 150 | 30 |
| Example 3 | substrate with cured oligomer (3) thereon | 320 | 91 | 150 | 30 |
| Comparative Example 1 | commercially available product (polymethacrylate plate) | 80 | 74 | 70 | 52 |
| Comparative Example 2 | commercially available product (polycarbonate plate) | 150 | 75 | 100 | 48 |
| Comparative Example 3 | substrate with cured oligomer (4) thereon | 87 | 90 | 75 | 50 |
| Comparative Example 4 | substrate with cured oligomer (4) thereon | 87 | 90 | 150 | warpage |

As confirmed from the results of Examples and Comparative examples, the allyl ester substrates of the present invention showed very excellent values of Tg, total light transmission and surface resistance than the conventional substrates.

The invention claimed is:

1. A transparent conductive substrate, which is obtained by forming a transparent electrode on an allyl ester resin substrate having a glass transition temperature of 160° C. or higher, which substrate is prepared by curing an allyl ester resin composition,
wherein the allyl ester resin composition contains consists essentially of an allyl ester oligomer having an ester structure formed of polyvalent alcohol and dicarboxylic acid, having allyl group and/or methallyl group as terminuses, and
wherein the dicarboxylic acid is at least one kind selected from the group consisting of terephthalic acid, isophthalic acid and phthalic acid.

2. The transparent conductive substrate claimed in claim 1, wherein at least one of the allyl ester oligomers has a group represented by formula (2) as terminus, and also has a structure represented by formula (3) as constituent unit,

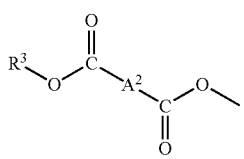
(2)

wherein $R^3$ represents an allyl group or a methallyl group, $A^2$ represents one or more kinds of organic residue having an alicyclic structure and/or an aromatic ring structure derived from dicarboxylic acid,

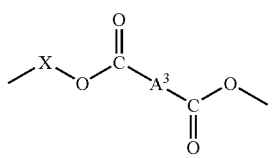
(3)

wherein $A^3$ represents one or more kinds of organic residue having an alicyclic structure and/or an aromatic ring structure derived from dicarboxylic acid, X represents one or more kinds of organic residue derived from polyvalent alcohol, with a proviso that X may have a branched structure through ester bonds, having a group represented by formula (2) as terminus and a group represented by formula (3) as constituent unit.

3. A transparent electrode plate for touch panel, using the transparent conductive substrate claimed in claim 1 as an electrode.

4. A touch panel having the electrode plate claimed in claim 3.

5. A transparent electrode plate for liquid crystal display device, using the transparent conductive substrate claimed in claim 1 as an electrode.

6. A liquid crystal display device, using the electrode plate claimed in claim 5.

7. A transparent electrode plate for organic EL display device, using the transparent conductive substrate claimed in claim 1 as an electrode.

8. An organic EL display device, using the electrode plate claimed in claim 7.

9. A transparent conductive substrate, comprising a transparent electrode and an allyl ester resin substrate having a glass transition temperature of 160° C. or higher, wherein the transparent electrode is formed on the allyl ester resin substrate and the allyl ester resin substrate is prepared by curing an allyl ester resin composition,
wherein the allyl ester resin composition consists essentially of an allyl ester oligomer having an ester structure formed of polyvalent alcohol and dicarboxylic acid, having allyl group and/or methallyl group as terminuses, and
wherein the dicarboxylic acid is 1,4-cyclohexane dicarboxylic acid.

10. The transparent conductive substrate claimed in claim 9, wherein the allyl ester resin substrate has a glass transition temperature of 200° C. or higher.

11. The transparent conductive substrate claimed in claim 9, wherein at least one of the allyl ester oligomers has a group represented by formula (2) as terminus, and also has a structure represented by formula (3) as constituent unit,

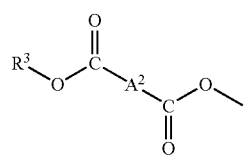
(2)

wherein $R^3$ represents an allyl group or a methallyl group, $A^2$ represents one or more kinds of organic residue having an alicyclic structure and/or an aromatic ring structure derived from dicarboxylic acid,

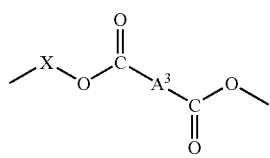
(3)

wherein $A^3$ represents one or more kinds of organic residue having an alicyclic structure and/or an aromatic ring structure derived from dicarboxylic acid, X represents one or more kinds of organic residue derived from polyvalent alcohol, with a proviso that X may have a branched structure through ester bonds, having a group represented by formula (2) as terminus and a group represented by formula (3) as constituent unit.

12. A transparent electrode plate for touch panel, using the transparent conductive substrate claimed in claim 9 as an electrode.

13. A touch panel having the electrode plate claimed in claim 12.

14. A transparent electrode plate for liquid crystal display device, using the transparent conductive substrate claimed in claim 9 as an electrode.

15. A liquid crystal display device, using the electrode plate claimed in claim 14.

16. A transparent electrode plate for organic EL display device, using the transparent conductive substrate claimed in claim 9 as an electrode.

17. An organic EL display device, using the electrode plate claimed in claim 16.

18. A transparent conductive substrate, comprising a transparent electrode and an allyl ester resin substrate having a glass transition temperature of 160° C. or higher, wherein the transparent electrode is formed on the allyl ester resin substrate and the allyl ester resin substrate is prepared by curing an allyl ester resin composition, wherein the allyl ester resin composition consists essentially of an allyl ester oligomer having an ester structure formed of polyvalent alcohol and dicarboxylic acid, having allyl group and/or methallyl group as terminuses, and at least one compound represented by formula (1),

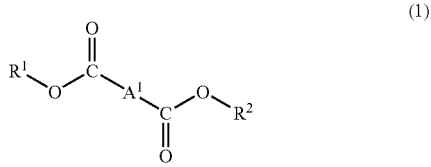
(1)

wherein $R^1$ and $R^2$ each independently represent an allyl group or a methallyl group, $A^1$ represents one or more kinds of organic residues having an alicyclic structure or aromatic ring structure derived from dicarboxylic acid, and wherein the dicarboxylic acid is 1,4-cyclohexane dicarboxylic acid.

19. The transparent conductive substrate claimed in claim 18, wherein the allyl ester resin substrate has a glass transition temperature of 200° C. or higher.

20. The transparent conductive substrate claimed in claim 18, wherein at least one of the allyl ester oligomers has a group represented by formula (2) as terminus, and also has a structure represented by formula (3) as constituent unit,

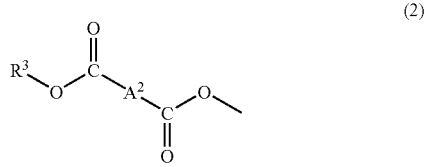
(2)

wherein $R^3$ represents an allyl group or a methallyl group, $A^2$ represents one or more kinds of organic residue having an alicyclic structure and/or an aromatic ring structure derived from dicarboxylic acid,

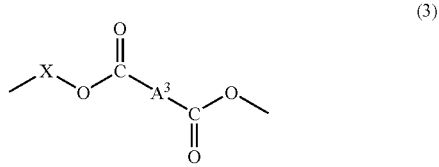
(3)

wherein $A^3$ represents one or more kinds of organic residue having an alicyclic structure and/or an aromatic ring structure derived from dicarboxylic acid, X represents one or more kinds of organic residue derived from polyvalent alcohol, with a proviso that X may have a branched structure through ester bonds, having a group represented by formula (2) as terminus and a group represented by formula (3) as constituent unit.

21. A transparent electrode plate for touch panel, using the transparent conductive substrate claimed in claim 18 as an electrode.

22. A touch panel having the electrode plate claimed in claim 21.

23. A transparent electrode plate for liquid crystal display device, using the transparent conductive substrate claimed in claim 18 as an electrode.

24. A liquid crystal display device, using the electrode plate claimed in claim 23.

25. A transparent electrode plate for organic EL display device, using the transparent conductive substrate claimed in claim 18 as an electrode.

26. An organic EL display device, using the electrode plate claimed in claim 25.

27. A transparent conductive substrate, comprising a transparent electrode and an allyl ester resin substrate having a glass transition temperature of 160° C. or higher, wherein the transparent electrode is formed on the allyl ester resin substrate and the allyl ester resin substrate is prepared by curing an allyl ester resin composition, wherein the allyl ester resin composition consists essentially of
(i) an allyl ester oligomer having an ester structure formed of polyvalent alcohol and dicarboxylic acid, having allyl group and/or methallyl group as terminuses,
(ii) a curing agent, and
(iii) a reactive monomer and/or a radically-reactive resin component, and wherein the dicarboxylic acid is 1,4-cyclohexane dicarboxylic acid.

28. The transparent conductive substrate claimed in claim 27, wherein the allyl ester resin substrate has a glass transition temperature of 200° C. or higher.

29. The transparent conductive substrate claimed in claim 27, wherein at least one of the allyl ester oligomers has a group represented by formula (2) as terminus, and also has a structure represented by formula (3) as constituent unit,

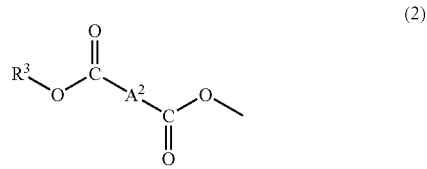
(2)

wherein $R^3$ represents an allyl group or a methallyl group, $A^2$ represents one or more kinds of organic residue having an alicyclic structure and/or an aromatic ring structure derived from dicarboxylic acid,

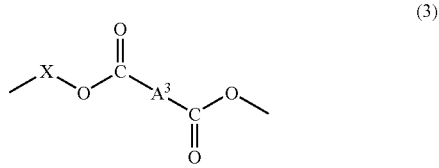
(3)

wherein $A^3$ represents one or more kinds of organic residue having an alicyclic structure and/or an aromatic ring structure derived from dicarboxylic acid, X represents one or more kinds of organic residue derived from polyvalent alcohol, with a proviso that X may have a branched structure through ester bonds, having a group represented by formula (2) as terminus and a group represented by formula (3) as constituent unit.

30. A transparent electrode plate for touch panel, using the transparent conductive substrate claimed in claim 27 as an electrode.

31. A touch panel having the electrode plate claimed in claim 30.

32. A transparent electrode plate for liquid crystal display device, using the transparent conductive substrate claimed in claim 27 as an electrode.

33. A liquid crystal display device, using the electrode plate claimed in claim 32.

34. A transparent electrode plate for organic EL display device, using the transparent conductive substrate claimed in claim 27 as an electrode.

35. An organic EL display device, using the electrode plate claimed in claim 34.

36. A transparent conductive substrate, comprising a transparent electrode and an allyl ester resin substrate having a glass transition temperature of 160° C. or higher, wherein the transparent electrode is formed on the allyl ester resin substrate and the allyl ester resin substrate is prepared by curing an allyl ester resin composition,
   wherein the allyl ester resin composition consists essentially of
   (i) an allyl ester oligomer having an ester structure formed of polyvalent alcohol and dicarboxylic acid, having allyl group and/or methallyl group as terminuses,
   (ii) at least one compound represented by formula (1)

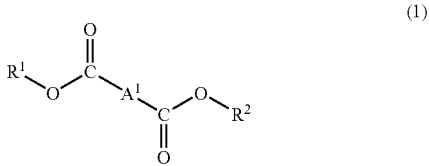

wherein $R^1$ and $R^2$ each independently represent an allyl group or a methallyl group, $A^1$ represents one or more kinds of organic residues having an alicyclic structure or aromatic ring structure derived from dicarboxylic acid,
   (iii) a curing agent, and
   (iv) a reactive monomer and/or a radically-reactive resin component, and
   wherein the dicarboxylic acid is 1,4-cyclohexane dicarboxylic acid.

37. The transparent conductive substrate claimed in claim 36, wherein the allyl ester resin substrate has a glass transition temperature of 200° C. or higher.

38. The transparent conductive substrate claimed in claim 36, wherein at least one of the allyl ester oligomers has a group represented by formula (2) as terminus, and also has a structure represented by formula (3) as constituent unit,

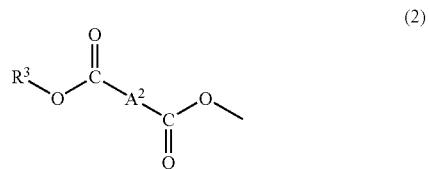

wherein $R^3$ represents an allyl group or a methallyl group, $A^2$ represents one or more kinds of organic residue having an alicyclic structure and/or an aromatic ring structure derived from dicarboxylic acid,

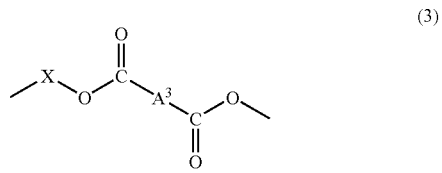

wherein $A^3$ represents one or more kinds of organic residue having an alicyclic structure and/or an aromatic ring structure derived from dicarboxylic acid, X represents one or more kinds of organic residue derived from polyvalent alcohol, with a proviso that X may have a branched structure through ester bonds, having a group represented by formula (2) as terminus and a group represented by formula (3) as constituent unit.

39. A transparent electrode plate for touch panel, using the transparent conductive substrate claimed in claim 36 as an electrode.

40. A touch panel having the electrode plate claimed in claim 39.

41. A transparent electrode plate for liquid crystal display device, using the transparent conductive substrate claimed in claim 36 as an electrode.

42. A liquid crystal display device, using the electrode plate claimed in claim 41.

43. A transparent electrode plate for organic EL display device, using the transparent conductive substrate claimed in claim 36 as an electrode.

44. An organic EL display device, using the electrode plate claimed in claim 43.

* * * * *